Feb. 19, 1935.  W. I. CARPENTER  1,992,120
APPARATUS FOR PRODUCING MOLD AND SPRUE OPENINGS
Filed Sept. 1, 1933  5 Sheets-Sheet 1
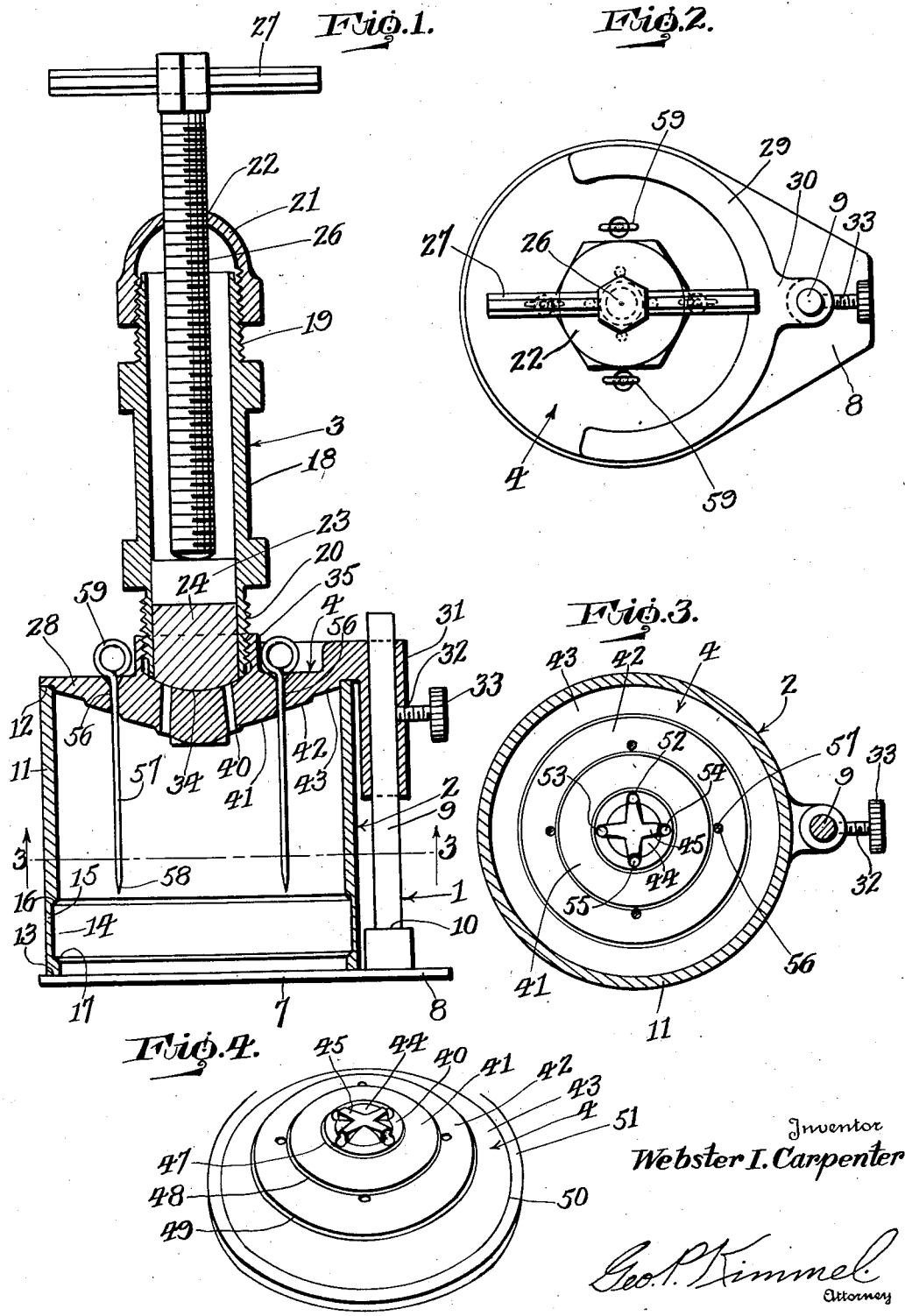
Inventor
Webster I. Carpenter
Geo. P. Kimmel
Attorney Feb. 19, 1935. W. I. CARPENTER 1,992,120
APPARATUS FOR PRODUCING MOLD AND SPRUE OPENINGS
Filed Sept. 1, 1933 5 Sheets-Sheet 2
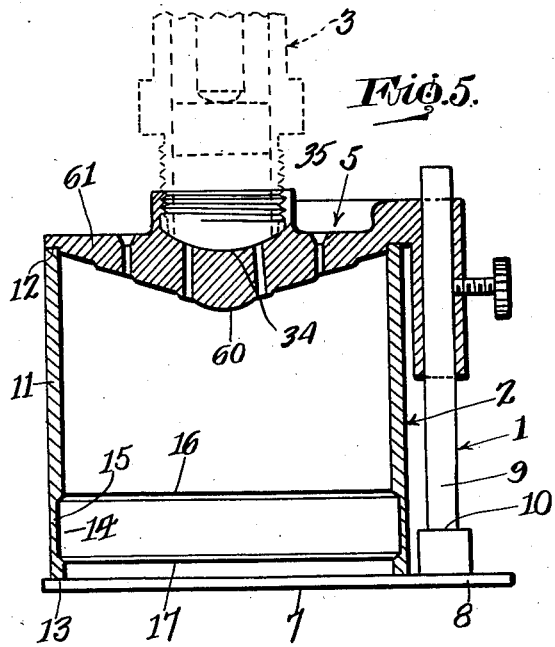
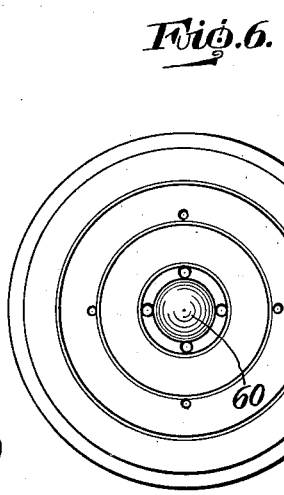
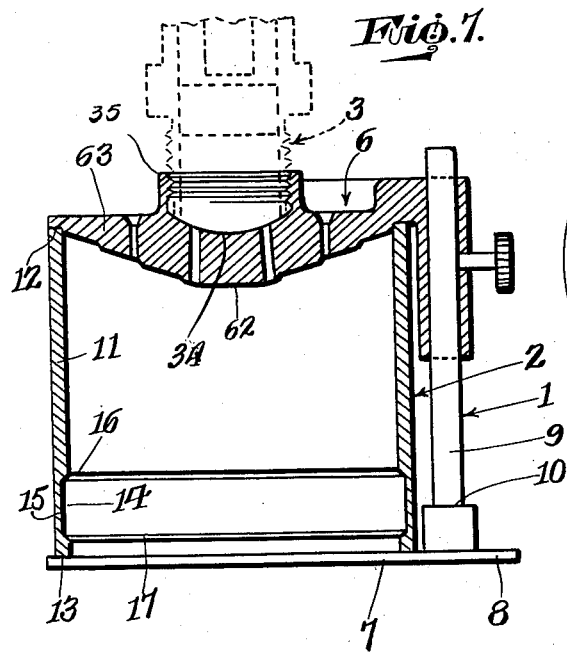
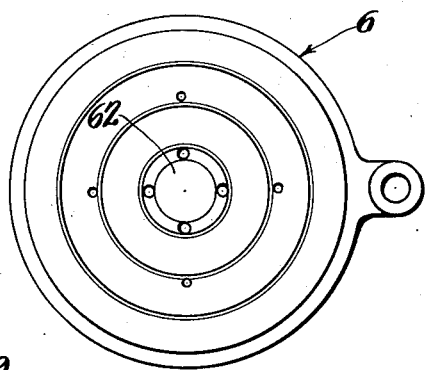
Inventor
Webster I. Carpenter
By Geo. P. Kimmel
Attorney Feb. 19, 1935.     W. I. CARPENTER     1,992,120
APPARATUS FOR PRODUCING MOLD AND SPRUE OPENINGS
Filed Sept. 1, 1933     5 Sheets-Sheet 3

Inventor
Webster I. Carpenter
By Geo. P. Kimmel
Attorney

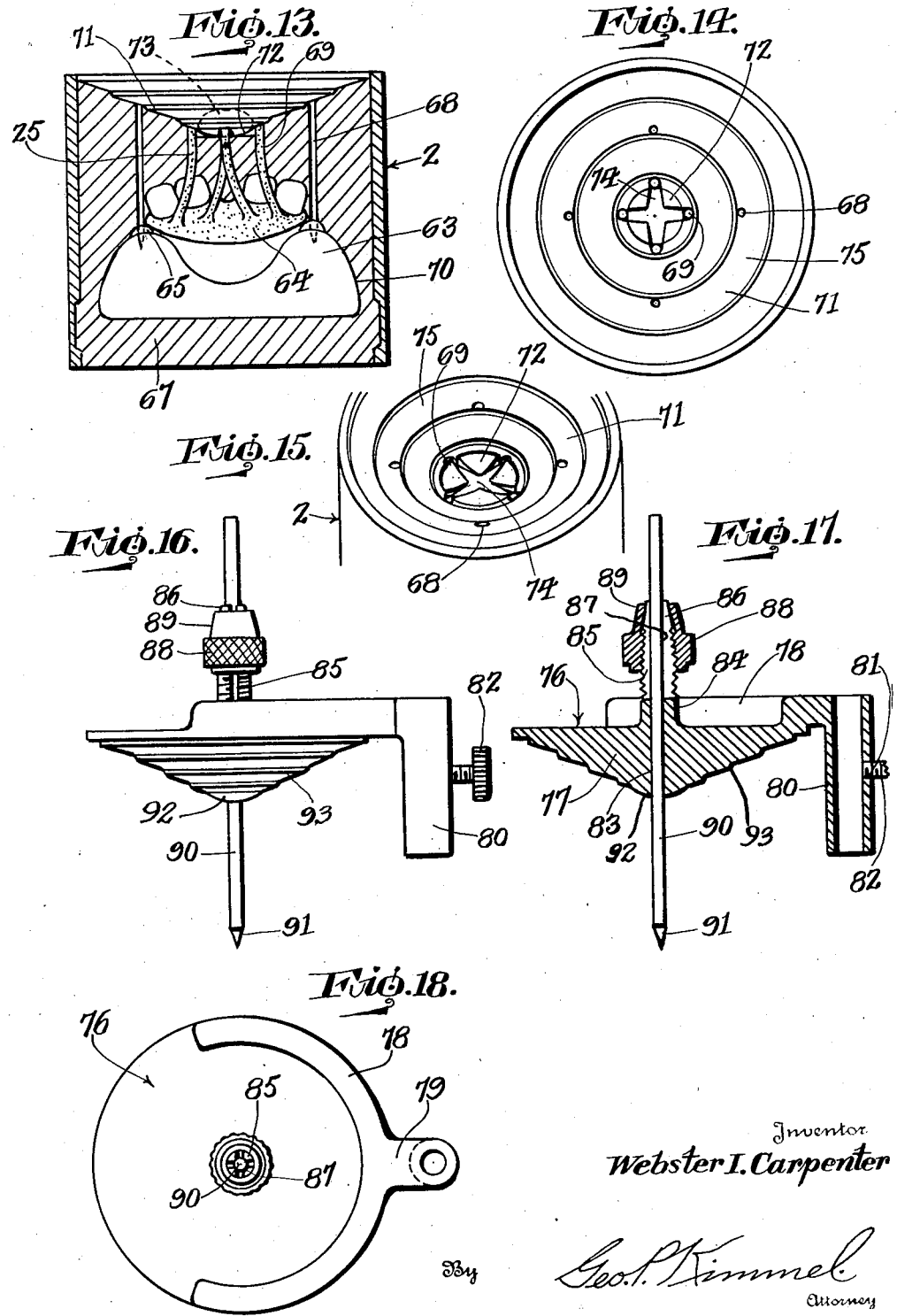

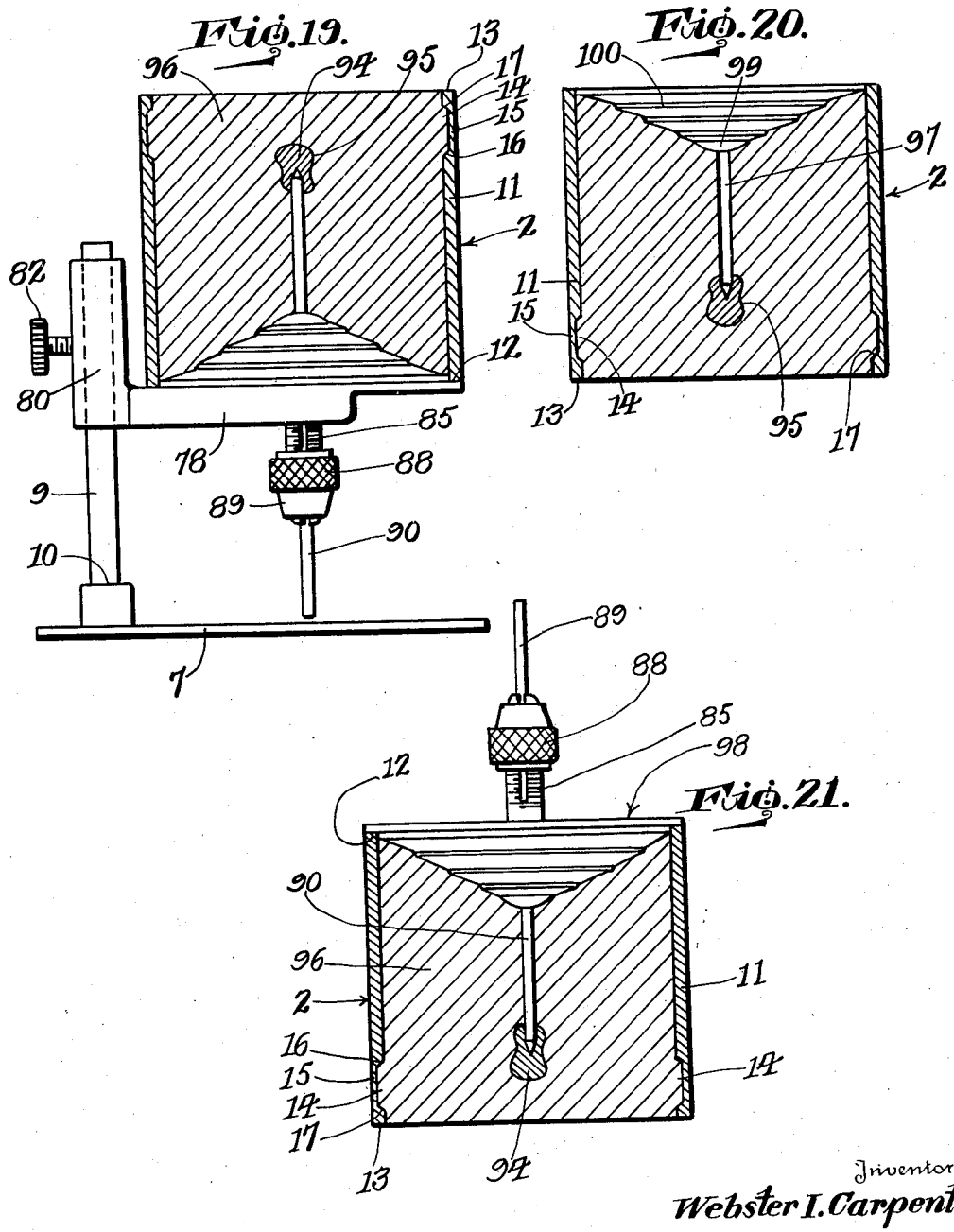

Patented Feb. 19, 1935

1,992,120

UNITED STATES PATENT OFFICE 1,992,120

APPARATUS FOR PRODUCING MOLD AND SPRUE OPENINGS

Webster I. Carpenter, Norfolk, Va.

Application September 1, 1933, Serial No. 687,862

16 Claims. (Cl. 22—162)

This invention relates to an apparatus for producing mold and sprue openings designed primarily for use by the dental profession, but it is to be understood that the apparatus may be employed in any connection for which it may be found applicable, and it has for its object to provide, in a manner as hereinafter set forth, an apparatus of the class referred to for forming a mold body having an opening at one end formed with a wall of stepped or terrace-like form and molten metal conducting means leading from the wall of said opening to the molding cavity of said body.

A further object of the invention is to provide, in a manner as hereinafter set forth, an apparatus of the class referred to for forming a mold body end with means acting to support a body of metal to be melted and to arrest the shifting of the metal to an extent, when the mold is carried around with the rotatable element of a centrifugal casting machine, to not prevent and to facilitate the molten metal entering a metal conducting means leading to the molding cavity of the mold.

A further object of the invention is to provide, an apparatus of the class referred to having as a part thereof means for forming and connecting therewith a sprue and further including removal means coacting with the sprue for stabilizing a model relative to said first mentioned means during the formation of a sprue opening leading to the molding cavity of a mold and simultaneously with the producing of the sprue opening providing a mold body end with an end opening having its wall of stepped or terrace-like contour and with the sprue opening extending from the said wall.

A further object of the invention is to provide, in a manner as hereinafter set forth, an apparatus of the class referred to including means to form a mold having one end of its body provided with an inverted frusto-conoidal shaped opening having a wall of terrace-like form and intakes to sprue openings at the base of said opening surrounding in spaced relation the axis of the mold body.

A further object of the invention is to provide, in a manner as hereinafter set forth, an apparatus of the class referred to including means to form a mold having one end of its body provided with an inverted frusto-conoidal shaped opening, intakes to sprue openings at the base of said opening surrounding in spaced relation the axis of the mold body and channels leading from such axis to the sprue openings.

A further object of the invention is to provide, in a manner as hereinafter set forth, an apparatus of the class referred to having means to constitute a combined mold body end former, sprue former and model stabilizer.

To the above ends essentially and to others which may hereinafter appear, the invention consists of such parts, and such combination of parts which fall within the scope of the invention as claimed.

In the drawings:

Figure 1 is a vertical sectional view of the elements of the apparatus in stacked relation.

Figure 2 is a top plan view of the elements of the apparatus in stacked relation.

Figure 3 is a section on line 3—3 Figure 1 looking in the direction of the arrows.

Figure 4 is a perspective view looking towards the inner face of the combined mold body end former, sprue former and model stabilizing structure with the stabilizing pins omitted.

Figure 5 is a vertical sectional view illustrating a modified form of combined mold body end former, sprue former and model stabilizing structure in its initial supporting position and with the stabilizing pins omitted.

Figure 6 is an inverted plan view of the modified form of combined mold body end former, sprue former and model stabilizing structure with the stabilizing pins omitted.

Figure 7 is a view similar to that of Figure 5 illustrating another modified form of combined mold body end former, sprue former and model stabilizing structure with the stabilizing pins omitted.

Figure 8 is a view similar to that of Figure 6 illustrating the other modified form of combined mold body end former, sprue former and model stabilizing structure with the stabilizing pins omitted.

Figure 13 is a vertical sectional view of the mold formed from the apparatus and with the stabilizing pins removed.

Figure 14 is a top plan view of the mold produced by the apparatus.

Figure 15 is a fragmentary view in perspective illustrating the upper end of the mold produced by the apparatus.

Figure 16 is a side elevation of a still another modified form of mold body end former and sprue opening former structure.

Figure 17 is a cross sectional view of the structure shown in Figure 16.

Figure 18 is a top plan view of the structure shown in Figure 16.

Figure 19 is a modified form of the apparatus partly in elevation and partly in section and illustrating a mold in inverted position and produced from the structure shown in Figure 16, and with the sprue within the investing material for the model.

Figure 20 is a vertical sectional view of the mold shown in Figure 19 with the sprue removed.

Figure 21 is a vertical sectional view of still another modified form of mold body end former and sprue former structure and showing its adaptation with respect to a completed mold.

Figure 9:
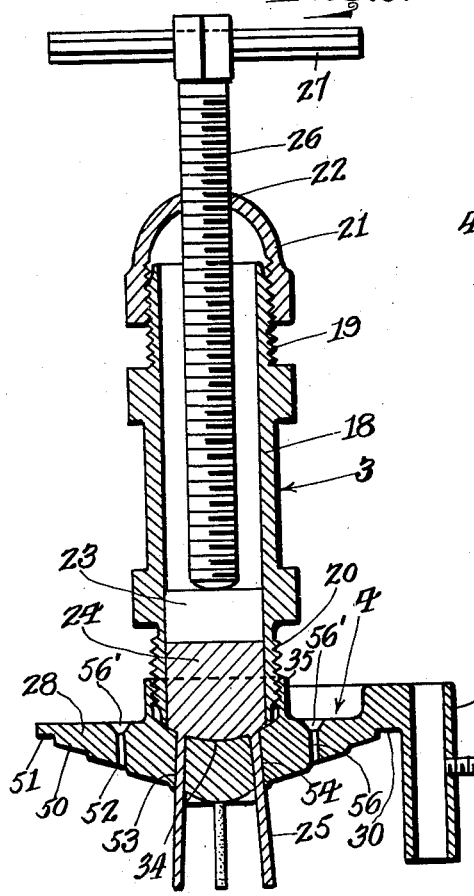
Figure 9 is a fragmentary view in vertical section of the apparatus showing a series of sprues formed thereby.

With respect to Figures 1, 5 and 7 of the drawings, the apparatus includes a support, a casting ring, a combined mold body end former, sprue former and model stabilizing structure, and a supply gun for the material for the sprues. In Figures 1, 5 and 7 the support, casting ring and gun are of like form and generally indicated at 1, 2 and 3 respectively. In Figures 13, 19 and 20 the casting ring is also designated 2 as the construction thereof is the same as that shown in Figures 1, 5 and 7.

The combined mold body end former, sprue former and model stabilizing structure shown in Figure 1 is generally indicated at 4; that shown in Figure 5 at 5 and that shown in Figure 7 at 6.

The support 1 consists of a circular base 7 formed at one side with a tapered lateral extension 8 having anchored thereto a vertically disposed post 9 provided in proximity to its lower end with a peripheral shoulder 10 forming a stop for a purpose to be referred to.

The casting ring 2 which forms an element of the mold, the later will be hereinafter referred to, consists of an annular body 11 of sleeve-like form. The body 2 may be of any suitable height and internal area, as well as any desired thickness. The end edges of body 11 are designated 12, 13. The inner face of body 11 below the transverse median thereof and spaced from edge 13 is formed with an endless groove 14 provided with an inner or base wall 15, an upper side wall 16 and a lower side wall 17. The walls 16, 17 merge at their inner ends into the top and bottom respectively of the wall 15. The wall 16 extends upwardly throughout from its inner end towards the axis and edge 12 of body 11. The wall 17 extends downwardly throughout from its inner end towards the axis and edge 13 of body 11. The height or cross sectional length of wall 15 is materially greater than the cross sectional length of either wall 16, 17. Preferably the height or cross sectional length of wall 15 will correspond to or be greater than the combined cross sectional lengths of the walls 16, 17. The outer end of wall 16 is arranged below the transverse median of body 11. The outer end of wall 17 is positioned in close proximity to edge 13 of body 11. The purpose of constructing the casting ring 2 in the manner stated will be hereinafter referred to.

Figure 10:
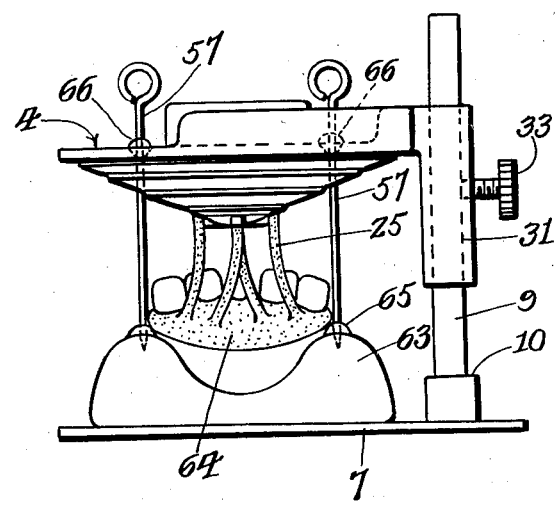
Figure 10 is a fragmentary view in elevation of the apparatus illustrating a model connected to the sprues and stabilizer.
Figure 11:
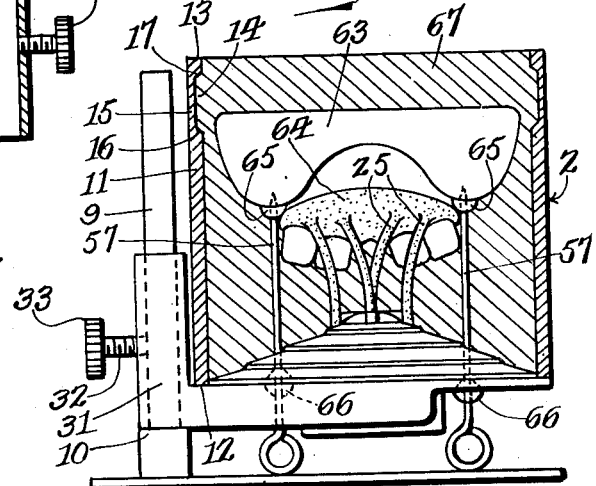
Figure 11 is a fragmentary view in elevation and in section illustrating the investing material encompassing the sprues, stabilizing pins and model.
Figure 12:
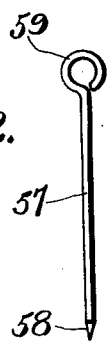
Figure 12 is an elevation of the form of stabilizing pin employed.

The gun 3 is of the reversible type, that is to say the material from which the sprues are formed may be expelled from either end thereof. The gun 3 includes a cylinder 18 open at each end and formed at one end with peripheral threads 19 and at its other end with peripheral threads 20. An interiorly threaded and apertured cap member 21 selectively engages with the threads 19, 20 for coupling it to cylinder 18. The aperture in member 21 is designated 22 and has its wall threaded. Within the cylinder 18 is a material expelling element 23 which bears against the inner end of a plug of a volatilizable wax-like material 24 positioned in cylinder 18 and from which the sprues 25, Figures 9, 10 and 11 are made. Threadedly engaging with the wall of the aperture 22 is a rotatable peripherally threaded shifting bar 26 for the element 23. The outer end of bar 26 carries a handle piece 27. When the material 24 is to be expelled from the gun 3 the later is coupled to a structure 4, 5 or 6 as shown, by utilizing the peripheral threaded portion of cylinder 18 not engaged by the cap member 21. When the material 24 is exhausted at one end of the cylinder 18 the gun is uncoupled, the cap member and bar removed from the other end and then coupled to the first mentioned end of the cylinder. A plug of material 24 is then inserted into the cylinder from the other end of the latter against the element 23. In Figures 1, 5, 6 and 9 the gun 3 is shown coupled with structures 4, 5 or 6 by the peripheral threaded portion 20 of cylinder 18. The end edges of the latter are beveled.

Each of the structures 4, 5 and 6 include a body part of inverted frusto-conoidal contour and of an outline corresponding to the shape of casting ring 2. By way of example, the said body parts and casting ring are shown of circular form.

The body part of structure 4 is designated at 28 and is formed on the marginal portion of its upper face with a semi-circular rib 29 having extending outwardly therefrom and centrally thereof a lateral arm 30 merging into the upper end of a vertically disposed depending sleeve 31 formed with an opening 32 intermediate its ends. The wall of the opening is threaded and engaged by a set screw 33. The sleeve 31 is mounted on post 9 and the screw 33 coacts with the post for anchoring in set position structure 4 over base 7. The shoulder 10 arrests the downward movement of sleeve 21.

The upper face of body part 28 axially thereof is formed with a concave recess 34 against which is to bear the outer end of the plug of material 24. Integral with the upper face of body part 28 and surrounding the recess 34 is an interiorly threaded collar 35 which coacts with the threads 19 or 20 of cylinder 18 for coupling gun 3 at right angles with respect to the said body part 28. The lower face of the latter is provided with a series of stepped endless facets 40, 41, 42 and 43. Each facet in cross section is disposed at an upward inclination from its lower end. The facet 40 is arranged below facet 41. The latter is arranged below facet 42. The latter is arranged below the facet 43. The facet 40 is the inner and the facet 43 is the outer facet of the series. The lower face of body part 28 is also formed axially thereof with a circular facet 44 arranged below and surrounded by facet 40. The facet 44 is of segmental cross section and is formed with a plurality of radially disposed ribs 45 gradually increasing in height from their inner to their outer ends and of inversely tapered cross section. The ribs 45 extend laterally from the axis of to the edge of facet 44. The facets 40, 41, 42 and 43 are separated by endless outwardly inclined shoulders 47, 48 and 49. The facet 40 merges into the outer end of shoulder 47. The facet 41 terminates at its inner side at the inner end of shoulder 47. The facet 41 merges into the outer end of shoulder 48. The facet 42 terminates at its inner side at the inner end of shoulder 48 and merges into the outer end of shoulder 49. The facet 43 at its inner end terminates in the inner end of the shoulder 49. The outer marginal portion of the inner face of body part 28 is rabbeted to provide an annular shoulder 50 and a ledge 51. The facet 43 merges into the outer end of shoulder 50. The diameter of the latter corresponds substantially to the inner diameter at the upper end of casting ring 2 and coacts with the inner face of the latter to prevent the shifting of the ring and structure 4 relative to each other when such parts are in the position as shown in Figure 11.

The body part 28 is formed with a set of spaced sprue former openings, as shown by way of example, four in number and designated 52, 53 54 and 55. The openings are inclined outwardly from their upper to their lower ends. The intake ends of the openings communicate with the recess 34. The outlet or inner ends of the openings are arranged at the facet 40. The body part 28 is also formed with a set of spaced vertical openings, as shown by way of example, four in number and indicated at 56. The wall of each opening 56 at its upper end is countersunk as at 56′ to provide substantially a pocket for a purpose to be referred to. The openings 56 are arranged between the collar 35 and outer edge of body part 28. The inner ends of openings 56 are arranged preferably at the inner side of facet 42.

Removably mounted in each of the openings 56 is a stabilizing pin 57 which is flat pointed or drill pointed at one end as at 58 and is formed with a loop or eye 59 at its other end.

The structure 5 is set up in the same manner as the structure 4, with this exception, that the ribs 45 are dispensed with on the circular facet 60 axially of the inner face of the body part 61 of structure 5. The parts of structure 5 which correspond to parts of structure 4 are designated by like reference characters used in connection for designating the corresponding parts of structure 4. Otherwise than that as stated structure 5 will be the same as structure 4.

The structure 6 is set up in the same manner as the structures 4 and 5 with this exception, the ribs 45 are dispensed with on the circular facet 62 axially of the inner face of the body part 63 of structure 5, and that facet 62 is flat and not of segmental contour. The parts of structure 6 which correspond to parts of structure 4 are designated by like reference characters used in connection for designating the corresponding parts of structure 4. Otherwise than that as stated structure 6 will be the same as structures 4 and 5.

With reference to Figure 9, gun 3 and structure 4 have been coupled together and rod 26 operated in a direction to force portions of the material 24 when slightly warmed through the openings 52, 53, 54 and 55 to form a set of sprues 25 of the desired length. After the sprues have been formed, the gun 3 is detached from structure 4. Preferably the stabilizing pins are not mounted in structure 4 when the sprues are formed.

A model 63 of the mouth with a removable bridge 64 or other form of wax thereon is placed upon base 7. The structure 4 is then secured to the support 1 in the position shown in Figure 10. The stabilizing pins 57 extend through openings 56 and engage into the model 63. The pins are waxed to model 63 as at 65 and also waxed to structure 4 as at 66. The countersunk portions of the walls of the openings 56 provide pockets to receive the wax 66. This arrangement anchors the pins to the model and structure 4 and stabilizes the model. The lower ends of the wax sprues are then made integral with the bridge 64 by melting the wax.

The structure 4 with the model attached is then inverted and anchored to support 1 in the position shown in Figure 11. The top edge of casting ring 2 is then mounted on ledge 51 and encloses and extends above the model 63. The ring 2 is then filled with a fireproof investing material 67 and which encompasses the model, wax bridge, sprues and pins. The material is to be flush with the edge 13 of ring 2 and to fill the groove 14. After the investment has set, the structure 4 with the ring and investing material are then removed from support 1 and inverted. The pins are then withdrawn from structure 4 and the investing material, and the structure 4 lifted off the ring and the product remaining will be as shown in Figure 13 and which is a unit formed of the casting ring and a mold body part provided with the openings 68, sprue openings or channels 69 filled by the sprues 25, a molding cavity 70 filled by the model 63 and removable bridge 64 and an inverted frusto-conoidal shaped opening 71 in the upper end of the body part of the mold. The base of the wall of opening 71 is of concave cross section and provides a centering support 72 for the body of metal 73, Figure 13 which is to be melted. The support 72 is formed with radially disposed grooves 74 which extend from the axis thereof to the intake end of the sprue openings 69 and with the remaining portion of the wall of opening 71 of terrace-like form as indicated at 75.

When structure 5 is employed in lieu of structure 4, the unit resulting from its use will be the same as that resulting when structure 4 is employed with this exception, that the facet 60 of structure 5 provides a concave support for the body of metal 73, but such support is not formed with grooves 74. When structure 6 is employed in lieu of that resulting when either structure 4 or 5 is employed, with this exception, that the facet 62 of structure 6 provides a flat support for the body of metal 73, but such support is not formed with grooves 74.

When the unit is subjected to heat whereby the wax forming the sprues and the wax forming the bridge or other form passes off by volatilization, the body of metal brought to a molten condition and which fills that portion of the molding cavity from which the wax bridge or other form has been removed whereby a metal bridge or other object will be cast. As is well known, after the wax has been removed and the metal 73 has been brought to a molten condition, the unit with the molten metal is subjected to the action of a centrifugal casting machine to force the molten metal in the mold.

Figures 16, 17, 18 and 19 illustrate a form of combined sprue opening and mold body and terracing structure 76 which does not include the stabilizing pins. The structure 76 is employed for making a single sprue opening leading to a molding cavity for a small casting. The structure 76 is employed in connection with the support 1 and includes a body part 77 of inverted frusto-conoidal contour and which has the outer marginal portion of its outer face provided with a semi-circular rib 78 formed centrally thereof with an outwardly directed lateral arm 79, merging into the upper end of a depending sleeve 80 formed with an opening 81  The wall of the latter is threaded and engaging therewith is a set screw 82. The sleeve 80 is adapted to be mounted on post 9 and screw 82 coacts with the latter for maintaining structure 76 in set position. The body part 77 axially thereof is formed with an axial opening 83 extending from its outer to its inner face. Integral with the outer face of body part 77 is a collar 84 having its inner face registering with and forming a continuation of the wall of opening 84. Integral with collar 84 is a set of spaced parallel peripherally threaded triangular shaped clamping members 85 having tapered outer ends 86 and their inner corners grooved throughout and lengthwise thereof as at 87. Coacting with the members 85 is a peripherally knurled and internally threaded adjustable binding nut 88 having a tapered tubular extension 89, riding against the tapered ends 86 for the purpose of detachably connecting to the body part 77 a sprue 90 having a pointed end 91. The inner face of the body part 77 is formed with a circular facet 92 of segmental cross section, and the remaining portion of such face is set up with terrace forming means 93 for the same purpose as the facets formed on the inner face of the body part of structures 4, 5 and 6. Attached to the inner end of the sprue 90 is a body of wax 94 conforming in contour to that of the casting to be formed and which provides a molding cavity 95 in the investing material 96. The sprue 90 forms a sprue opening 97 leading to cavity 95. The structure 76 when used to provide the mold unit will be initially positioned relative to the support 1 as shown in Figure 19. After the investing material 96 has been poured into the casting ring as shown in Figure 19, and sufficient time has elapsed for it to thoroughly harden, the structure 90 or sprue opening former is first removed from the structure 76 by first releasing nut 88. Next remove structure 76 from the unit, the latter then appearing as is shown in Figure 20.

The very great advantage of having sprue opening former pin 90 detachable is duofold. First it prevents the distortion of the sprue opening 97 in the investment material when the unit 76 is forced from the top of the investment unit. Second it gives the dentist the choice of detaching the sprue opening former pin from 76, and using it (90) to attach to the inlay model in the tooth in the patient's mouth to remove the wax model therefrom, as is generally the custom with a large number of dentists. It is readily seen that the latter procedure would be greatly handicapped if it were not possible to detach pin 90 from the structure 76.

Figure 21 discloses a modified form of structure 76 shown in Figures 16, 17, 18 and 19 and in this connection the structure 98 shown in Figure 21 will be the same as the structure 76 with this exception, that structure 98 is not provided with rib 78, arm 79 and sleeve 80. Otherwise than that as stated structure 98 will be the same as and performs the same function as structure 76. The structure 98 is used without the support 1. Casting ring 2 is placed with end 13 on a plane or flat surface, filled with investment and structure 98 put in position as shown in Figure 21

The structures 76 and 98 form the mold body part with an opening at one end having the base of the wall of such opening in the form of a concave recess 99 to receive the body of metal to be melted, the remaining portion of such wall of terrace-like form as at 100, the molding cavity 95 and the sprue opening 97 leading from recess 99 to cavity 95.

The setting up of the casting ring in the manner as shown prevents breakage of the investment carried thereby on the contraction an expansion of the ring and which is provided for by the groove in the inner face of the ring. The construction of the ring also provides for maintaining the body of the investment or mold body flush with the bottom edge of the ring on the contraction and expansion of the latter. The angular side walls of the groove act to allow the investment to slide in the desired direction on the contraction and expansion of the ring and which prevents any possibility of the investment cracking.

What I claim is:—

1. In an apparatus of the character described, a combined mold body end former, sprue former and model stabilizing structure having provision on its lower face to provide an end of the mold with an opening having its wall of terrace-like form, said structure including a plurality of openings for the passage of and for forming sprues to provide sprue openings in the mold body leading from said end opening, and said structure including removable elements for stabilizing a model during the application of investing material around the model to provide the mold body.

2. In an apparatus of the character described, a combined mold body end former, sprue former and model stabilizing structure including a plurality of openings for forming and for the passage of sprues to provide sprue openings in the model, said structure provided with means on its lower face and with said means having provisions to provide an end of the mold with an opening having the base portion of its wall in the form of a recess to receive a body of metal and with the wall of the recess formed with grooves leading to the sprue openings and with the remaining portion of the wall of the opening in the end of the mold of terrace-like form, and said structure including removable elements for stabilizing a model during the application of investing material around the model to provide the mold body.

3. In an apparatus of the character described, a combined mold body end former, sprue former and model stabilizing structure having provision on its lower face to provide an end of the mold with an opening having its wall of terrace-like form, said structure including a plurality of openings for the passage of and for forming sprues to provide sprue openings in the mold body leading from said end opening, said structure including removable elements for stabilizing a model during the application of investing material around the model to provide the mold body, and said structure being formed with laterally disposed offset means for detachably connecting it to a support.

4. In an apparatus of the character described, a combined mold body end former, sprue former and model stabilizing structure including a plurality of openings for forming and for the passage of sprues to provide sprue openings in the model, said structure provided with means on its lower face and with said means having provisions to provide an end of the mold with an opening having the base portion of its wall in the form of a recess to receive a body of metal and with the wall of the recess formed with grooves leading to sprue openings and with the remaining portion of the wall of the opening in the end of the mold of terrace-like form, said structure including removable elements for stabilizing a model during the application of investing material around the model to provide the mold body, and said structure being formed with laterally disposed offset means for detachably connecting it to a support.

5. In an apparatus of the character described, a combined mold body end former, sprue former and model stabilizing structure, an expelling element carrying sprue forming material, said structure having means on its upper face for detachably connecting said element therewith and a plurality of openings for receiving material from said element to form and for the passage of sprues, and said structure having its lower face formed with means having provisions to provide a mold end with an opening having its wall of terrace-like form.

6. In an apparatus of the character described, a combined mold body end former, sprue former and model stabilizing structure, an expelling element carrying sprue forming material, said structure having means on its upper face for detachably connecting said element therewith and a plurality of openings for receiving material from said element to form and for the passage of sprues, said structure having its lower face formed with means having provisions to provide a mold end with an opening having its wall of terrace-like form, a support, said structure and support having coacting means for detachably and selectively connecting said structure thereto in righted and reversed positions, a casting ring, and said structure having means when in reversed position for supporting on the marginal portion of its lower face said casting ring.

7. In an apparatus of the character described, an invertible mold body end former, sprue former and model stabilizing structure, an expelling element carrying sprue forming material, said structure having means on its upper face for detachably connecting said element therewith and being provided with a plurality of openings for receiving material from said element to form sprues and for the passage of the latter and adapted when in righted and reversed positions and when said element is detached therefrom to be detachably coupled by the sprues to the model, a support for the model, said support and structure including means for selectively and removably connecting the structure in righted and reversed positions to the support, said structure when in reversed position provided with removable means for stabilizing the model relative thereto, a casting ring for retaining a mold body forming material in encompassing relation with respect to said model and sprues thereby providing a molding cavity and sprue openings leading from one end of the mold body to said cavity, said structure when in reversed position having means for supporting said ring, and said structure being provided on its inner face with means having provisions for forming said end of the mold body with an opening communicating with the sprue openings and having its wall of terrace-like form.

8. In an apparatus for the purpose set forth, an element of substantially conoidal contour adapted to have the marginal portion of its inner face seated against one end of a casting ring, said element being formed with an opening, a sprue forming material carrier for detachable connection to the outer face of said element and provided with means for expelling a part of the material carried thereby therefrom through and coacting with said opening to form a sprue extended from said inner face into the casting ring, a base, and said base and element having coacting lengthwise interengaging adjustable means for respectively suspending said element with the carrier attached thereto to position the inner face of said element in opposed spaced relation with the upper face of the base and to position the outer face of the carrier in opposed spaced relation to the upper face of the base with the carrier detached from said outer face.

9. In an apparatus for the purpose set forth, an invertible element for closing when in one position one end of a casting ring and in its other position for supporting said ring from the closed end of the latter, said element being formed with spaced openings, a sprue forming material carrier for detachable connection to one face of said element when the latter is in non-supporting position for the casting ring, said carrier being provided with means for expelling therefrom portions of the material carried thereby through and coacting with said openings to form sprues extended from the other face of said element into the casting ring, a base, and said element and base having coacting adjustable means for selectively suspending said element in its two positions over the base in spaced relation relative to the latter.

10. In an apparatus for the purpose set forth, an invertible element for closing when in one position one end of a casting ring and in its other position for supporting said ring from the closed end of the latter, said element being formed with spaced openings, a sprue forming material carrier for detachable connection to one face of said element when the latter is in non-supporting position for the casting ring, said carrier being provided with means for expelling therefrom portions of the material carried thereby through and coacting with said openings to form sprues extended from the other face of said element into the casting ring, a base, and said element and base having coacting adjustable means for selectively suspending said element in its two positions over the base in spaced relation relative to the latter, said element being formed with spaced apertures, and removable model stabilizing members extending through said apertures.

11. In an apparatus for the purpose set forth, an invertible element of substantially conoidal contour having an opening for receiving a sprue opening former, said element having as a part thereof a sleeve disposed parallel to the axis of and completely offset with respect to the side of said element, said sleeve being open at each end thereof, a base, a post anchored to and eccentrically disposed with respect to the base, said post for extension into said sleeve, and means carried by the sleeve and coacting with the post for selectively and detachably securing said element suspended in non-inverted and in inverted positions over said base.

12. In an apparatus for the purpose set forth, a combined sprue holder and mold end former element consisting of a substantially conoidal shaped body having a semi-circular rib integral with a part of the marginal portion of one of its faces, said body being formed with an opening for receiving a sprue opening former, said rib being formed with a lateral arm extended outwardly therefrom, a sleeve open at each end and integral at one end with said arm, and a set screw carried by said sleeve intermediate its ends.

13. In an apparatus for the purpose set forth, a sprue holder and mold end former element having a body having a tapered inner face formed of a series of spaced upwardly outwardly inclined annular facets, a series of spaced upwardly outwardly inclined annular shoulders and a circular central facet terminating in the outer end of the inner shoulder of said series of shoulders, said inner shoulder connecting said circular facet to the inner facet of said series of facets, the other shoulders of said series being arranged between and connecting said facets together, and said body being formed with a plurality of sprue receiving openings extending from the outer face thereof and terminating at said circular facet.

14. In an apparatus for the purpose set forth, a sprue holder and mold end former element having a body having a tapered inner face formed of a series of spaced upwardly outwardly inclined annular facets, a series of spaced upwardly outwardly inclined annular shoulders and a circular central facet terminating in the outer end of the inner shoulder of said series of shoulders, said inner shoulder connecting said circular facet to the inner facet of said series of facets, the other shoulders of said series being arranged between and connecting said facets together, said circular facet being formed with radially disposed ribs merging into each other at their inner ends and having their outer ends terminating adjacent the edge of the circular facet, and said body being formed with a plurality of sprue receiving openings extending from the outer face thereof and to said circular facet adjacent the outer ends of said ribs.

15. In an apparatus for the purpose set forth, a combined sprue holder and mold end former element having its inner face of a contour so shaped to form an end of a mold with a centering support for a body of metal to be melted and a plurality of terraces leading outwardly from said support, said element being formed centrally of its outer face with a concave recess, an internally threaded collar surrounding said recess and a plurality of sprue receiving openings extending from the bottom of said cavity to the inner face of said element, and a sprue forming material carrier detachably connected to said collar and provided with means for expelling portions of the material carried thereby through said openings to form sprues extended from the inner face of said element.

16. In an apparatus for the purpose set forth, a combined sprue holder and mold end former element having its outer face provided with a concavity, means surrounding the cavity for connecting to said element a sprue forming material carrier and a plurality of sprue receiving openings extending from said concavity to the inner face of said element, and a sprue forming material carrier for attaching to said means and being formed with parts acting on the material carried thereby for forcing portions of said material through said openings to form sprues extended from the inner face of said element.

WEBSTER I. CARPENTER.